United States Patent
Widera et al.

(10) Patent No.: US 10,166,901 B2
(45) Date of Patent: Jan. 1, 2019

(54) SEAT FOR A MOTOR VEHICLE

(71) Applicant: GM GLOBAL TECHNOLOGY OPERATIONS LLC, Detroit, MI (US)

(72) Inventors: Thomas Widera, Ruesselsheim (DE); Meik Daumeyer, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 15/440,863

(22) Filed: Feb. 23, 2017

(65) Prior Publication Data
US 2017/0240077 A1 Aug. 24, 2017

(30) Foreign Application Priority Data
Feb. 24, 2016 (DE) .................... 20 2016 001 171 U

(51) Int. Cl.
*B60N 2/90* (2018.01)
*B60N 2/68* (2006.01)

(52) U.S. Cl.
CPC .............. *B60N 2/99* (2018.02); *B60N 2/68* (2013.01); *B60N 2/682* (2013.01); *B60N 2/90* (2018.02); *B60N 2/914* (2018.02)

(58) Field of Classification Search
CPC ........ B60N 2/99; B60N 2/4492; B60N 2/914; B60N 2/4415; B60N 2/68
See application file for complete search history.

(56) References Cited

U.S. PATENT DOCUMENTS

| 4,589,695 A | * | 5/1986 | Isono | A47C 7/022 297/284.11 |
| 4,742,984 A | * | 5/1988 | Cote | B60N 2/015 221/4 |
| 6,682,059 B1 | * | 1/2004 | Daniels | A47C 4/54 267/131 |
| 6,782,573 B2 | * | 8/2004 | Odderson | A47C 4/54 5/654 |
| 7,040,707 B2 | | 5/2006 | Nakahara | |
| 7,237,846 B1 | * | 7/2007 | Arima | B60N 2/6009 297/452.18 |

(Continued)

FOREIGN PATENT DOCUMENTS

DE 3127303 A1 1/1983
DE 19510789 C2 7/2002

(Continued)

OTHER PUBLICATIONS

German Patent Office, German Search Report for German Application No. 20 2016 001 171.6, dated Nov. 22, 2016.

*Primary Examiner* — Philip F Gabler
(74) *Attorney, Agent, or Firm* — Lorenz & Kopf, LLP

(57) ABSTRACT

A seat includes a back part and a seat part having a seat cover, padding, and a support structure. The seat cover delimits a seat area, which is divided into a central bearing area and two side support areas. An air bladder is located in each of the side support areas. The air bladders can be inflated or deflated for changing the vertical position of the seat area on the side support areas. A bearing part is arranged between the support structure and the air bladder. A fastener constructed as a latching connection is configured to fix the bearing part on the support structure.

14 Claims, 3 Drawing Sheets

(56) References Cited

U.S. PATENT DOCUMENTS

| | | | | |
|---|---|---|---|---|
| 8,136,883 B2* | 3/2012 | Rehfuss | ................ | B60N 2/986 297/284.9 |
| 8,297,708 B2* | 10/2012 | Mizobata | ............ | B60N 2/7011 297/230.11 |
| 2009/0188045 A1* | 7/2009 | Anikin | ................ | B60N 2/4415 5/654 |
| 2016/0339814 A1* | 11/2016 | Tanaka | .................... | B60N 2/99 |

FOREIGN PATENT DOCUMENTS

| | | |
|---|---|---|
| DE | 10317356 A1 | 6/2004 |
| DE | 102004020116 A1 | 11/2005 |
| DE | 102005058311 B4 | 5/2008 |
| DE | 102007045552 A1 | 4/2009 |
| DE | 102007050092 A1 | 4/2009 |
| DE | 102008053080 A1 | 4/2010 |
| DE | 102009012739 A1 | 9/2010 |
| DE | 102010005801 A1 | 6/2011 |
| EP | 343025 B1 | 12/1992 |
| EP | 0670238 B1 | 7/1998 |
| WO | 2007112565 A1 | 10/2007 |
| WO | 2015054047 A1 | 4/2015 |

* cited by examiner

SEAT FOR A MOTOR VEHICLE

CROSS-REFERENCE TO RELATED APPLICATION

This application claims priority to German Patent Application No. 202016001171.6, filed Feb. 24, 2017, which is incorporated herein by reference in its entirety.

TECHNICAL FIELD

The present disclosure pertains to a seat and a motor vehicle.

BACKGROUND

Motor vehicles have an interior and seats are arranged inside the interior. In this case, the seats have a seat part and a back part. On front seats, the back part is generally pivotally mounted about a pivot axis. Rear seats are arranged behind the front seats inside the interior of the motor vehicle. The rear seats are generally combined to form a rear bench seat from three seats. The seat part delimits a seat area on the upper side and the back part delimits a back area. The seat area is used for supporting a posterior and the back area is used for supporting a back of a person. The seat area of the seat part is divided in the transverse direction of the motor vehicle into a central supporting area and two lateral side support areas. The two side support areas have a larger vertical distance from the floor of the motor vehicle compared to the central support area. The two side support areas are used when cornering, in order to be able to absorb the forces in the case of transverse accelerations, which act on the person in the seat.

In each case one air bubble structure or air bladder is installed below the two side support areas and air can be filled into the air bladders by a pneumatic pump to increase the volume of the air bladder. Using a valve, air can be let out of the air bladders to reduce the volume of the air bladders. As a result, the vertical position of the seat cover on the side support areas can be changed by the driver of the motor vehicle, as the pump and the valve can be controlled using corresponding controls. In the case of a sports driving style with higher cornering speeds, the volume in the air bladders can therefore be increased, in order to thereby achieve better side support by an elevation of the two side support areas. In a less sporty driving style using the motor vehicle, the volume of the air bladders can be reduced, so that as a result, the vertical elevation of the two side support areas can be reduced.

A plate-shaped bearing part is fastened between the two air bladders and a support structure as a frame of the seat. The two air bladders therefore do not bear directly against the support structure, but rather by the bearing part against the support structure of the seat part. The two bearing parts made from plastic are fixed on the support structure using rivets as fasteners. As the air bladders bear directly on the bearing parts and a direct contact of the air bladders with the rivets is to be avoided, the bearing part has a folding part, which is pivotable on the remaining bearing part using a film or living hinge. After fixing the bearing part using the rivets, pivoting of this folding part is necessary, so that as a result, the rivets are covered by the flap or the folding part. As a result, no contact is possible between the air bladders and the rivets.

This disadvantageously requires a high installation outlay on the one hand and the production of the bearing part is complex and expensive on the other hand. If the air bladder and the bearing part are removed, it is necessary in a complex manner to remove all components above the bearing part, that is to say in particular also the air bladder, subsequently to open and to pivot the flap, and subsequently a complex drilling out of the rivets is necessary. Removing the bearing part with the air bladder is therefore disadvantageously complicated in the event of servicing.

SUMMARY

The present disclosure provides a seat and a motor vehicle, in which the bearing part can be fastened on the support structure of the seat in a reliable and cost-effective manner and with little installation outlay. A seat includes a back part and a seat part including a seat cover, padding and a support structure. The seat cover of the seat part delimits a seat area and the seat area is divided into a central bearing area and two side support areas. At least one air bladder is provided with an adjustable volume such that the vertical position of the seat area at the side support areas can be changed. At least one bearing part is arranged between the support structure and the at least one air bladder. At least one fastener affixes the bearing part on the support structure. The fastener is constructed as a latching connection. When producing the seat, therefore only a latching connection is necessary for fixing the bearing part on the support structure. As a result, the complex production of a rivet connection between the bearing part and the support structure is eliminated.

The latching connection is expediently constructed as a latching connection device. The latching connection and/or the latching connection device is constructed, preferably exclusively on the bearing part.

In an additional embodiment, the latching connection is constructed in one piece on the remaining bearing part. During the production of the bearing part by injection molding from plastic, preferably thermoplastic, the latching connection, particularly the at least one latching connection on one bearing part in each case, can therefore also be produced in a particularly cost-effective manner during injection molding. The bearing part is therefore cost-effective in terms of production. In a further variant, at least one counterpart geometry, particularly a latching recess and/or undercut is constructed on the support structure for the latching connection. The counterpart geometry is necessary for a positive connection between the latching connection and the support structure. In an additional embodiment, the latching connection includes a latching lug and an elastically deformable catch.

In a supplementary variant, the latching lug is arranged inside a latching recess of the support structure and the catch functions as a stop, which positively blocks a movement of the latching lug out of the latching recess. During the installation of the seat, merely an insertion of the latching lug into the latching recess is required and during the introduction, an elastic deformation of the latching lug takes place and after the at least partial insertion of the latching lug into the latching recess, an elastic recovery of the catch takes place, so that as a result, after the elastic recovery of the catch, the catch functions as a stop. The latching connection between the bearing part and the support structure can therefore be produced during the installation of the seat, particularly easily, cost-effectively and reliably with a low risk of installation errors.

In a further embodiment, the geometry of the support structure and the latching connection is constructed in such a manner that the catch is manually accessible, so that an elastic deformation of the catch can be executed by a force manually applied to the catch and the latching connection can subsequently be moved out of the latching recess of the support structure in a destruction-free manner. To remove the bearing part and the air bladder from the support structure of the seat, a force can easily be applied by hand to the catch. As a result, owing to an elastic deformation of the catch, the latching lug can subsequently be moved together with the catch out of the latching recess, and thus the bearing part can be removed from the support structure. Thus, a destruction-free removal of the bearing part from the support structure is possible in an advantageous manner and furthermore, no removal of the components above the bearing part is necessary for this. In the event of servicing, a particularly simple removal of the air bladder and the bearing part from the support structure is therefore possible.

In particular, the latching connection is a clip connection and/or a clip connection device. In a further embodiment, the catch is of rod-shaped construction.

The support structure is expediently constructed from a metal sheet and/or from metal, particularly steel. The support structure is preferably constructed in a frame-shaped, particularly substantially rectangular, manner.

In an additional embodiment, the bearing part is constructed from plastic. The bearing part can therefore be produced in a particularly simple manner in one piece by injection molding from plastic, particularly thermoplastic plastic. In an additional embodiment, the bearing part is constructed in a substantially disc- or plate-shaped manner. In a supplementary variant, the bearing part bears directly against the support structure.

In an additional embodiment, a lower intermediate part is arranged in each case between the air bladder and the seat cover and/or the padding of the seat part. The lower intermediate part is constructed to be substantially rigid or non-bendable. As a result, in the event of a change of the volume of the air bladder, the change of the volume is executed not only at a part region of the air bladder, but rather in accordance with the movement kinematics of the lower intermediate part, particularly of a second section of the lower intermediate part, which can be pivoted about a pivot axis. A change of the shape of the air bladder occurs in accordance with this kinematics. As a result, a change of the vertical position of the seat cover takes place at a side support area in accordance with the kinematics of the lower intermediate part.

An upper intermediate part is expediently arranged in each case between the air bladder and the seat cover and/or the padding of the seat part. The upper intermediate part is preferably arranged above the lower intermediate part and the upper intermediate part is preferably located directly on the lower intermediate part. The upper intermediate part is elastically constructed and consequently also allows a correspondingly soft seat area at the two side support areas.

In an additional embodiment, the seat includes a pneumatic pump and a valve for filling and emptying the air bladder with air. In a supplementary variant, the air bladder is in each case formed by a flat bendable part, particularly a balloon-like article, with an inlet opening and outlet opening.

In an additional embodiment, the back part includes a seat cover, a support structure and padding and the seat cover of the back part delimits a back area.

In an additional embodiment, the seat includes more than one and preferably two air bladders. Likewise, the seat expediently includes more than one and preferably two bearing parts. In a supplementary variant, the seat includes more than one and preferably two lower intermediate parts. In a further embodiment, the seat includes more than one and preferably two upper intermediate parts.

In an additional embodiment, one side support area in each case, including an air bladder and a bearing part and preferably also including padding, an upper intermediate part, a lower intermediate part, are arranged below the seat cover. The side support area is preferably arranged from top to bottom in the following sequence: padding, upper intermediate part, lower intermediate part, air bladder and bearing part.

In a supplementary variant, the lower intermediate part is divided into a first section and a second section and the second section is connected to the first section in a pivotable manner using a hinge, particularly a film or living hinge. In an additional embodiment, the first section of the lower intermediate part is connected to the support structure using a fastener, so that the first section is preferably immovable with respect to the support structure. The second section of the lower intermediate part is expediently mounted in a pivotable manner with respect to the support structure owing to the hinge, so that preferably the second section of the lower intermediate part is pivotable owing to a volume change of the air bladder.

In a further embodiment, the lower intermediate part is constructed from plastic and/or constructed in a substantially plate-shaped manner and/or constructed in a substantially disc-shaped manner and/or constructed in a substantially rigid manner and/or constructed in a substantially non-bendable manner. In a further embodiment, the upper intermediate part is constructed from plastic and/or constructed in an elastic manner and/or constructed from foam and/or constructed in a substantially plate-shaped manner and/or constructed in a substantially disc-shaped manner and/or constructed in a substantially bendable manner.

The seat is preferably a seat for a motor vehicle. The seat cover is expediently constructed from material and/or leather, preferably the material is constructed from cotton and/or artificial fibers.

A motor vehicle according to the present disclosure, including: bodywork, a drive motor, particularly an internal combustion engine and/or an electric motor, at least one seat, the seat being constructed as a seat described in this property right application.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
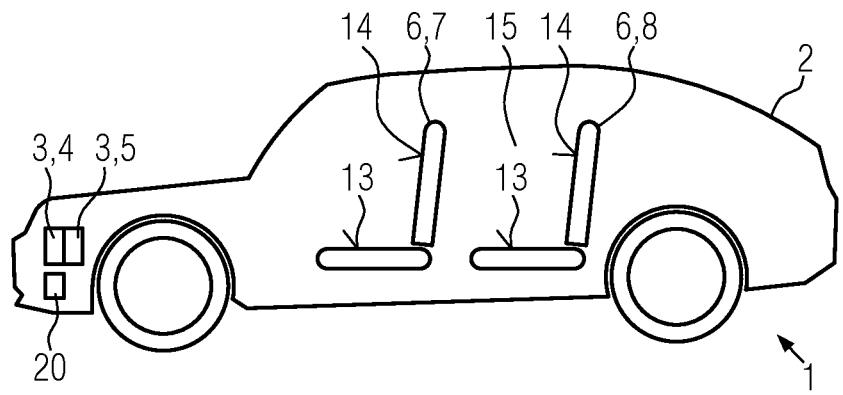
FIG. 1 shows a side view of a motor vehicle.

A motor vehicle 1 illustrated in FIG. 1 has bodywork 2 made from metal, particularly steel. The motor vehicle 1 is moved along by a drive motor 3, for example an electric motor 4 and/or an internal combustion engine 5. The bodywork 2 delimits an interior 15 and two front seats 7 are arranged as seat 6 and three rear seats 8 are arranged as seat 6 inside the interior 15. The three rear seats 8 are in this case combined to form a seat bench.

Figure 2:
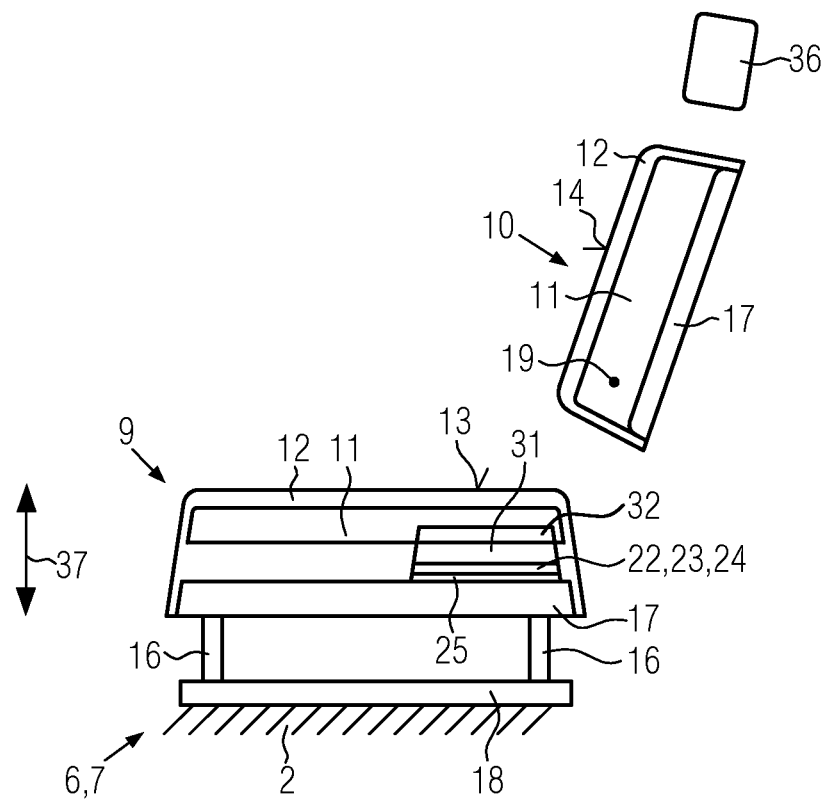
FIG. 2 shows a longitudinal section of a front seat of the motor vehicle.

A longitudinal section through the front seat 7 is illustrated in FIG. 2. The front seat 7 includes a seat part 9 and a back part 10. The seat part 9 and the back part 10 in each case have a frame-like support structure 17 on which padding 11 made from foam and a seat cover 12, for example a fabric, leather or plastic seat cover 12 are fastened. A head rest 36 is furthermore fastened on the back part 10. The seat part 9 is fastened on a rail 18 by support feet 16 and the rail 18 is fastened on the bodywork 2. In this case, the entire front seat 7 can be moved horizontally in the longitudinal direction of the motor vehicle 1 by the support feet 16, which are fastened on the rail 18. The support structure 17 of the back part 10 is connected to the support structure 17 of the seat part 9 by connecting parts, which are not illustrated, so that as a result during the horizontal movement of the front seat 7, both the seat part 9 and the back part 10 also execute the horizontal movement together. The back part 10 can be pivoted about a pivot axis 19.

Figure 3:
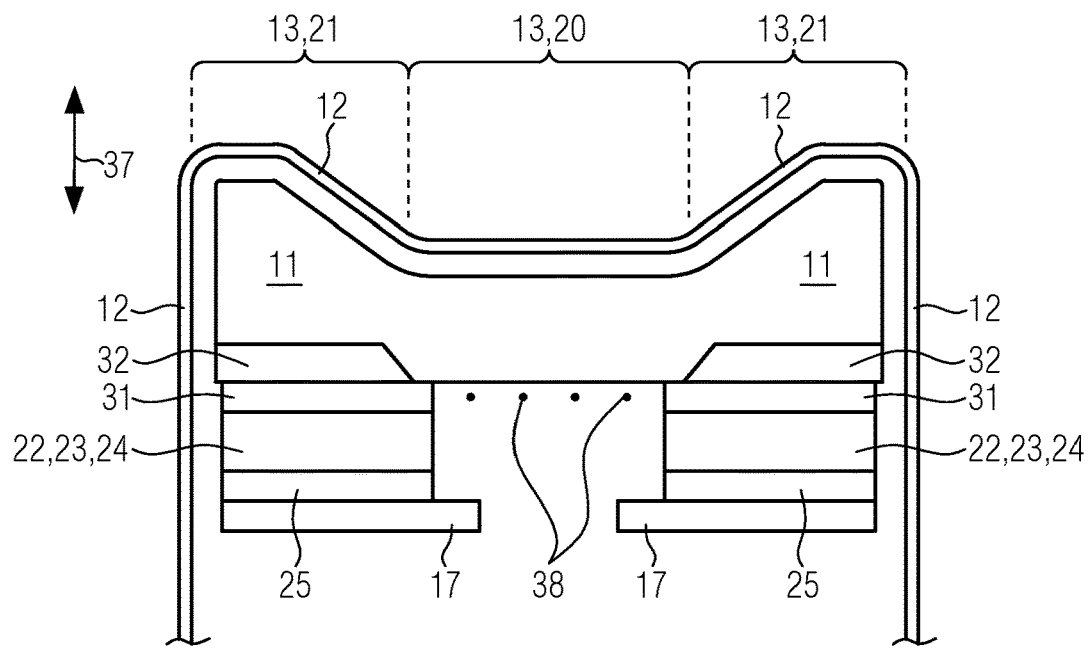
FIG. 3 shows a cross section of a seat part of the front seat according to FIG. 2.

The seat part 9 of the front seat 7 has a seat area 13 for sitting for a person and the back part 10 of the front seat 7 as seat 6 has a back area 14 for resting a back of a person on the seat 6. The seat 6 is constructed as a sports seat 6 for the motor vehicle 1 and in this case, the seat area 13 is divided into a central supporting region 20 and two side support areas 21 (FIG. 3). The two side support areas 21 are elevated in a vertical direction 37 with respect to the central supporting area 20, so that as a result, during cornering with the motor vehicle 1, forces acting on the person in the seat 6 from the two side support areas 21 due to transverse acceleration during cornering, can be absorbed accordingly by the two side support areas 21.

Figure 5:
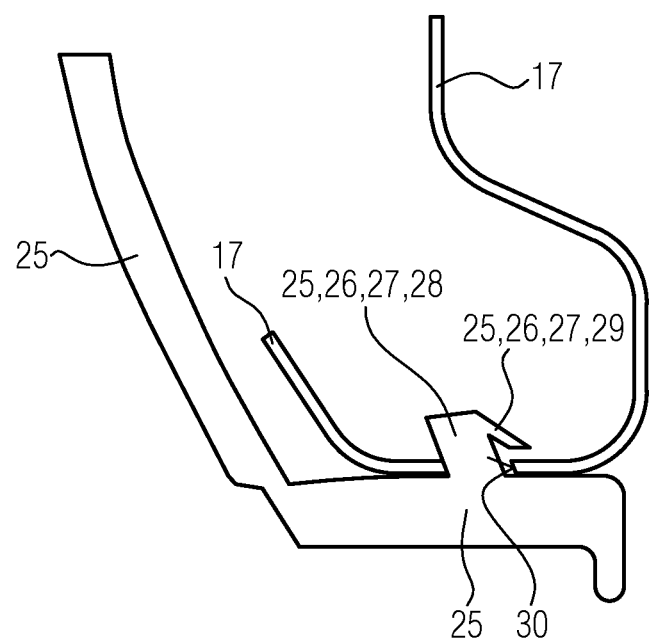
FIG. 5 shows a simplified section through the bearing part and the support structure of a seat part of the front seat according to FIG. 2 in the region of a latching connection.

The support structure 17 is constructed from metal, particularly steel, as a frame 17 and two plate-shaped bearing parts 25 made from plastic are in each case fixed laterally on a surface of the support structure 17. The bearing parts 25 are fixed to a fastener 26 as a latching connection 27 or latching connection device 27 at a latching recess 30 of the support structure 17. The latching connection 27 of each bearing part 25 includes a latching lug 28 and a rod-shaped catch 29 constructed on the latching lug 28. The latching connection 27, that is to say the latching lug 28 together with the catch 29, are in this case produced and constructed in one piece with the remaining bearing part 25, so that as a result, in an advantageous manner, the bearing part 25 can be produced in a particularly simple manner together with the latching connection 27 during injection molding from thermoplastic plastic using only one injection mold. To produce the connection as a positive connection between the support structure 17 and the bearing part 25, the latching lug 28 is to be introduced into the latching recess 30 (FIG. 5). As a result, an elastic deformation of the catch 29 occurs owing to the geometry of the catch 29. Subsequently, after the substantially complete introduction of the latching lug 28 together with the catch 29 into the latching recess 30 of the support structure 17, an elastic recovery of the catch 29 occurs, so that the correspondingly elastic recovered catch 29 realizes a stop for the latching lug 28 on the support structure 17 (FIG. 5). As a result, the latching lug 28 can no longer be moved out of the latching recess 30. During the installation of the seat 6, a particularly simple, cost-effective and reliable production of a positive connection between the bearing part 25 and the support structure 17 is therefore possible by the latching connection 27.

An air bladder 22 is located above the bearing part 25. The air bladder 22 is formed as a balloon-like article 24 by a flat expandable part 23. A lower disc-shaped intermediate part 31 is arranged above the air bladder 22. The lower intermediate part 31 is fastened on the support structure 17 using a fastener, and the lower intermediate part 31 is divided into a first section and a second section connected to the first section in a pivotable manner using a hinge. Only the first section of the lower intermediate part 31 is fastened on the support structure 17 using the fastener. As a result, the second section of the lower intermediate part 31 can be pivoted and thus moved relatively to the support structure 17 during a change of the volume of the air bladder 22. An upper intermediate part 32 made from foam is arranged above the lower intermediate part 31 made from essentially rigid plastic. The upper intermediate part 32 is therefore elastic. In this case, the upper intermediate part 32 is preferably integrated into the padding 11 or constructed as a separate component, supplementing the padding 11.

Figure 4:
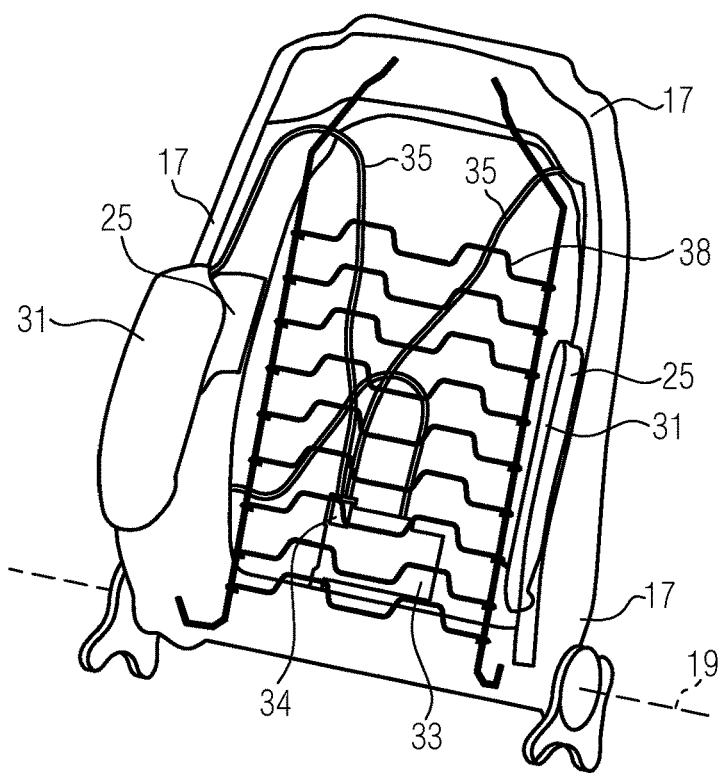
FIG. 4 shows a perspective view of a support structure of a seat part of the front seat according to FIG. 2 with two visible bearing parts and lower intermediate parts.

In FIG. 4, the air bladder 22 is covered by the lower intermediate part 31, so that in FIG. 4 the air bladder 22 cannot be seen. The padding 11 is located on the support structure 17 and on a spring mat 38 made from metal. A pneumatic pump 33 is additionally arranged in the seat 6 and the pneumatic pump 33 is driven by an electric motor, which is not illustrated. The pump 33 also includes a valve 34. From the pump 33 with the valve 34, two air hoses 35 are additionally guided to one air bladder 22 in each case. The motor vehicle 1 additionally includes a control and/or regulation unit, by which the pump 33 and/or the valve 34 can be controlled and/or regulated.

In the case of a sports driving style with the motor vehicle 1, air can therefore be pumped into the two air bladders 22 by the control and/or regulation unit and the pump 33, so that as a result, the position of the seat cover 12 on the two side support areas 21 is elevated in the vertical direction 37 to the position of the seat cover 12 on the central bearing area 20. Conversely, in the case of a less sporty driving style, air can be let out of the two air bladders 22 by the valve 34, so that as a result, the volume of the two air bladders 22 is reduced and thus the position of the seat cover 12 on the two side support areas 21 is reduced with respect to the position of the seat cover 12 on the central bearing area 20 with regards to the vertical direction 37. The vertical difference of the positions of the seat cover 12 is therefore changed between the two side support areas 21 on the one hand and the central bearing area 20 on the other hand.

Considered as a whole, substantial advantages are connected with the seat 6 according to the present disclosure and the motor vehicle 1 according to the present disclosure. When installing the seat 6, the bearing part 25 can securely and reliably be fastened on the support structure 17 using the latching connection 27. In the event of servicing, owing to the geometry of the support structure 17 and the latching connection 27, the positive connection between the bearing part 25 and the support structure 17 can furthermore be detached manually in a simple and destruction-free manner owing to the latching connection 27, in that an appropriate force is applied to the catch 29. As a result, the latching lug 27 and the elastically deformed catch 29 can be moved back out of the latching recess 30 in a destruction-free manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A seat having a back part and a seat part including a seat cover delimiting a seat area that is divided into a central support area, a first side support area adjacent to the central support area and a second side support area adjacent to the central support area opposite the first support area, the seat comprising:
   an air bladder assembly including a first air bladder disposed in the first side support area and a second air disposed in the second support area, wherein the air bladder assembly is inflatable and deflatable for changing the vertical position of the seat area on the first and second side support areas relative to the central support area;
   a support structure including a frame and a bearing part arranged between the frame and the air bladder assembly such that the first and second bladders are supported on a first side of the bearing part; and
   a fastener having a lug extending from a second side of the bearing part which is opposite the first side and an elastically deformable catch disposed on an end of the lug opposite bearing part, wherein the lug extends through an aperture formed in the frame and the deformable catch cooperates with the frame for positively blocking movement of the latching lug out of the aperture to provide a latching connection between the bearing part and the frame.

2. The seat according to claim 1, wherein the catch comprises a manually accessible catch, wherein an elastic deformation of the catch is affected by a force manually applied to the catch such that the latching connection is movable out of the latching recess of the support structure in a destruction-free manner.

3. The seat according to claim 1, wherein the catch comprises a rod-shaped element.

4. The seat according to claim 1, wherein the support structure comprises a metal frame.

5. The seat according to claim 1, wherein the bearing part comprises a plastic bearing part.

6. The seat according to claim 5, wherein the plastic bearing part comprises a disc-shaped plastic bearing part.

7. The seat according to claim 1, wherein the bearing part bears directly against the frame.

8. The seat according to claim 1, further comprising a padding and a lower intermediate part arranged between each of the air bladders and at least one of the seat cover and the padding.

9. The seat according to claim 8, further comprising an upper intermediate part arranged between each of the air bladders and at least one of the seat cover and the padding of the seat part.

10. The seat according to claim 1, further comprising a pneumatic pump and a valve for inflating and deflating each air bladder with air.

11. The seat according to claim 1, wherein each of the first and second bladders comprises a flat expandable part with an inlet opening and an outlet opening.

12. The seat according to claim 1, wherein the back part comprises a seat cover delimiting a back area, a support structure and padding.

13. A motor vehicle comprising bodywork, a drive motor, and at least one seat according to claim 1.

14. A seat for a motor vehicle comprising:
   a seat assembly including a seat cover delimiting a seat area that is divided into a central support area, a first side support area adjacent to the central support area and a second side support area adjacent to the central support area opposite the first support area;
   an air bladder assembly including a first air bladder disposed in the first side support area and a second air disposed in the second support area, wherein the air bladder assembly is inflatable and deflatable for changing the vertical position of the seat area on the first and second side support areas relative to the central support area;
   a support structure including a frame, a first bearing part supporting the first air bladder on the frame beneath the first side support area, and a second bearing part supporting the second air bladder on the frame beneath the second side support area;
   a first fastener having a first lug extending from the first bearing part on a side opposite the first air bladder and an elastically deformable catch disposed on an end of the first lug opposite first bearing part, wherein the first lug extends through a first aperture formed in the frame and the catch cooperates with the frame for positively blocking movement of the lug out of the first aperture to provide a latching connection between the first bearing part and the frame; and
   a second fastener having a second lug extending from the second bearing part on a side opposite the second air bladder and an elastically deformable catch disposed on an end of the second lug opposite second bearing part, wherein the second lug extends through a second aperture formed in the frame and the catch cooperates with the frame for positively blocking movement of the lug out of the second aperture to provide a latching connection between the second bearing part and the frame.

* * * * *